United States Patent
Torigoe

(10) Patent No.: US 9,261,868 B2
(45) Date of Patent: Feb. 16, 2016

(54) PROCESS CONTROL SYSTEM

(71) Applicant: YOKOGAWA ELECTRIC CORPORATION, Musashino-shi, Tokyo (JP)

(72) Inventor: Kenji Torigoe, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 374 days.

(21) Appl. No.: 13/827,634

(22) Filed: Mar. 14, 2013

(65) Prior Publication Data

US 2013/0253671 A1    Sep. 26, 2013

(30) Foreign Application Priority Data

Mar. 23, 2012   (JP) ................................ 2012-068041

(51) Int. Cl.
| | |
|---|---|
| G05B 19/042 | (2006.01) |
| G05B 15/02 | (2006.01) |
| G06F 11/14 | (2006.01) |
| G06F 11/20 | (2006.01) |

(52) U.S. Cl.
CPC ............ *G05B 15/02* (2013.01); *G05B 19/0421* (2013.01); *G06F 11/1482* (2013.01); *G06F 11/20* (2013.01); *G06F 11/2007* (2013.01); *G06F 11/2038* (2013.01); *G06F 11/2097* (2013.01)

(58) Field of Classification Search
CPC ............ G06F 9/45533; G06F 9/45541; G06F 9/45558; G06F 9/45562; G06F 9/4418; G06F 9/45545; G06F 9/4555
USPC .................................. 700/20; 717/168; 718/1
See application file for complete search history.

(56) References Cited

U.S. PATENT DOCUMENTS

| | | | | | |
|---|---|---|---|---|---|
| 6,047,222 | A | * | 4/2000 | Burns et al. ...................... | 700/79 |
| 7,340,574 | B2 | * | 3/2008 | Hall et al. ...................... | 711/163 |
| 7,814,495 | B1 | * | 10/2010 | Lim et al. ...................... | 718/104 |
| 8,364,291 | B2 | * | 1/2013 | Cook et al. ...................... | 700/82 |

(Continued)

FOREIGN PATENT DOCUMENTS

| | | |
|---|---|---|
| DE | 10245176 A1 | 4/2004 |
| DE | 102007062395 A1 | 6/2009 |

(Continued)

OTHER PUBLICATIONS

Bare-metal desktop hypervisors: A primer; by Job Brodkin; Published in Network World, Jul. 22, 2010; 6 pages.*

(Continued)

*Primary Examiner* — Ronald Hartman, Jr.

(74) *Attorney, Agent, or Firm* — Westerman, Hattori, Daniels & Adrian, LLP

(57) ABSTRACT

A process control system performing control of an industrial process implemented in a plant, may include: a network provided in the plant; a plurality of field devices connected to the network, each of the plurality of field devices is configured to perform at least one of measurement and actuation required for control of the industrial process; and a controller, connected to the network, having a virtual part configured to operate in hardware in place of hardware, and a control unit configured to operate in the virtual part and to control operations of the field devices via the network, the controller being configured to enable replacement of hardware without changing the control unit.

13 Claims, 6 Drawing Sheets

(56) References Cited

U.S. PATENT DOCUMENTS

| | | | |
|---|---|---|---|
| 8,543,642 B2* | 9/2013 | Corbett et al. | 709/203 |
| 8,631,404 B2* | 1/2014 | Laor | 718/1 |
| 2007/0078980 A1 | 4/2007 | Tomita et al. | |
| 2007/0168058 A1* | 7/2007 | Kephart et al. | 700/82 |
| 2009/0132057 A1* | 5/2009 | Kettu et al. | 700/5 |

FOREIGN PATENT DOCUMENTS

| | | |
|---|---|---|
| JP | 2001-306350 A | 11/2001 |
| JP | 2006-209624 A | 8/2006 |
| JP | 4399773 B2 | 1/2010 |
| WO | 2004/042482 A1 | 5/2004 |
| WO | 2005/050336 A1 | 6/2005 |
| WO | 2011/154211 A1 | 12/2011 |

OTHER PUBLICATIONS

Waldeck Boris, "Advancement of PLC instrumentation, Engineering Point of View and Practice Evaluation of SI, Keiso", Instrumentation Control Engineering, vol. 54, No. 7, Japan, Kogyogijutsusha, (2011), pp. 54-57, Cited in Japanese Office Action dated Dec. 17, 2013, issued in Japanese Patent Application No. 2012-068041 w/partial English translation.

"Virtualization Reduces the Cost of Supporting Open Industrial Control Systems ii Table of Contents", Jun. 30, 2009, pp. 1-9, cited in European Office Action issued in counterpart European Patent Application No. 13159189.3 dated Aug. 28, 2015 (11 pages).

* cited by examiner

PROCESS CONTROL SYSTEM

BACKGROUND OF THE INVENTION

1. Field of the Invention

The present invention relates to a process control system.

Priority is claimed on Japanese Patent Application No. 2012-068041, filed Mar. 23, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in plants, factories, and the like (hereinafter collectively referred to simply as plants), process control systems are implemented which control various state quantities such as pressure, temperature, and flow amount in industrial processes, and a high level of automated operation is achieved. In a conventional process control system, as shown, for example, in FIG. 7 of Japanese Patent (Granted) Publication No. 439973, FIG. 1 of PCT International Publication No. WO 2005/050336 and FIG. 1 of United States Patent Application, Publication No. 2007/0078980, the constitution is one in which a plurality of sensors, such as flow gauges and temperature gauges, and actuators, such as valves, are directly connected to controllers, the controllers controlling the actuators in accordance with the results of detection by the sensors, in order to control the above-noted various state quantities.

Although a plant is often designed to have a life of approximately 30 years, because general-purpose electronic components are used in the various devices that form the process control system (the above-described controller, sensors, and actuators), the life of the devices is determined by the life of the electronic components, and is approximately 10 years. Whereas a sensor that has reached the end of its life can be individually replaced, because general-purpose electronic components are mounted in I/O cards, which are the interfaces in controllers, the life of controllers is limited to approximately 10 years, and the life of the process control system is also limited.

In this manner, because the various devices that make up a process control system have lives that are shorter than that of the plant, it is necessary to replace (reconstruct) the process control system before the plant reaches the end of its life. As shown in FIG. 1 of Japanese Patent (Granted) Publication No. 439973, FIG. 2 of PCT International Publication No. WO 2005/050336 and FIG. 2 of United States Patent Application, Publication No. 2007/0078980, the extension of the life of a process control system can be envisioned by adopting a constitution in which various devices making up the process control system are connected to the same network and in which the above-noted I/O cards are eliminated.

The various devices making up a process control system use general-purpose electronic components in parts other than the controller I/O cards. For this reason, even if it is possible to extend the life of the process control system by eliminating the I/O cards as described above, the process control system will ultimately need to be replaced.

With the dramatic advances in technological made in recent years, it can be thought that there is a great possibility that a new process control system will be developed before the plant reaches the end of its life. Even when new technology is to be adopted, the existing process control system in the plant needs to be replaced by a new process control system.

In this case, in order to replace the process control system, it is basically necessary to stop the plant for a long period of time. For this reason, it should be considered that the cost of replacing the process control system is not only the cost of replacing the various devices making up the process control system, but also the cost of lost revenue from products that could have been produced if the plant had not been stopped. If such costs are considered, it is desirable to be able to change or add devices, while maintaining compatibility and without replacing the existing process control system.

SUMMARY

A process control system performing control of an industrial process implemented in a plant, may include: a network provided in the plant; a plurality of field devices connected to the network, each of the plurality of field devices is configured to perform at least one of measurement and actuation required for control of the industrial process; and a controller, connected to the network, having a virtual part configured to operate in hardware in place of hardware, and a control unit configured to operate in the virtual part and to control operations of the field devices via the network, the controller being configured to enable replacement of hardware without changing the control unit.

At least two of the controllers may be provided and operate redundantly.

The network may be made redundant.

The process control system may further include: input/output nodes connecting to the network, the input/output nodes being configured to relay a signal input/output at the field devices and a signal communicated via the network.

The process control system may further include: a spare controller connecting to the network, the spare controller having a virtual part configured to be capable of causing operation of a control unit that is the same as a control unit provided in a controller in which a failure has occurred.

The control unit may have the operating system that runs in the virtual part and an application that runs in the operating system.

The process control system may further include: a monitoring apparatus configured to monitor and manage an operating status of the operating system and the applications running in the controller so that the application in a controller in a standby status can be stopped, transfer being made to another controller that is idling and, after reaching synchronization with a currently used controller, redundant operation being started.

When replacing an old hardware to a new hardware, the old hardware may be removed from the network and the new hardware may be connected to the network, and then, a program implementing the virtual part may be first installed into the new hardware connected to the network so as to implement a functionality of the virtual part, and next, a program implementing the operating system and a program implementing the application that had been used previously in the old hardware may be successively installed into the new hardware, so as to implement a functionality of the operating system and the application, so that a previously used operating system and application can be run on the new hardware.

When replacing an old hardware to a new hardware, installing software into the new hardware may be performed beforehand and the new hardware subjected to this installing is then brought on-site so that it is possible to limit tasks performed on-site to a replacement of the hardware.

The network may include a first network and a second network. The process control system may further include: input/output nodes connecting to the first network and the second network, the input/output nodes being configured to relay a signal input/output at the field devices and a signal communicated via the first network and the second network.

The control unit may have an operating system that runs in the virtual part and an application that runs in the operating system. The process control system may further include: a monitoring apparatus configured to monitor and manage an operating status of the operating system and the applications running in the controller so that the application in a controller in a standby status can be stopped, transfer being made to another controller that is idling and, after reaching synchronization with a currently used controller, redundant operation being started.

When an old controller is replaced by a new controller and power is applied to the new controller, first the virtual part provided in the new controller may access the monitoring apparatus regarding the controller to which synchronization is to be done. When notification is made as to the controller to which synchronization is to be done, the virtual part of the new controller may communicate with the virtual part of the notified controller to which synchronization is to be done, and decide a synchronized operation starting time that is a starting point for synchronized operation. The virtual part of the new controller may go into a state of waiting for an arrival of the synchronized operation starting time. When the synchronized operation starting time arrives, the virtual part of the controller to which synchronization is to be done may transmit execution information to the virtual part of the new controller and, based on the execution information, the virtual part of the new controller may start synchronized operation.

A process control method for controlling an industrial process implemented in a plant, by using: a network provided in the plant; a plurality of field devices connected to the network, each of the plurality of field devices is configured to perform at least one of measurement and actuation required for control of the industrial process; and a controller, connected to the network, having a virtual part configured to operate in hardware in place of hardware, and a control unit configured to operate in the virtual part and to control operations of the field devices via the network, the controller being configured to enable replacement of hardware without changing the control unit. The process control method may include a step of replacing an old hardware to a new hardware, the step including: specifying a controller to be replaced; removing the old hardware from the network; connecting the new hardware to the network; installing a program implementing the virtual part into the new hardware connected to the network so as to implement a functionality of the virtual part; installing a program implementing the operating system that had been used previously in the old hardware into the new hardware, so as to implement a functionality of the operating system; and installing a program implementing the application that had been used previously in the old hardware into the new hardware, so as to implement a functionality of the application.

The process control method may further include: accessing, by the virtual part provided in the new controller, a monitoring apparatus regarding the controller to which synchronization is to be done when an old controller is replaced by a new controller and power is applied to the new controller; communicating, by the virtual part of the new controller, with the virtual part of the notified controller to which synchronization is to be done, and deciding a synchronized operation starting time that is a starting point for synchronized operation when notification is made as to the controller to which synchronization is to be done; going, by the virtual part of the new controller, into a state of waiting for an arrival of the synchronized operation starting time; transmitting, by the virtual part of the controller to which synchronization is to be done, execution information to the virtual part of the new controller when the synchronized operation starting time arrives; and starting, by the virtual part of the new controller, synchronized operation based on the execution information.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

A process control system in accordance with a preferred embodiment of the present invention will be described below, with references made to the drawings.

First Preferred Embodiment

Figure 1:
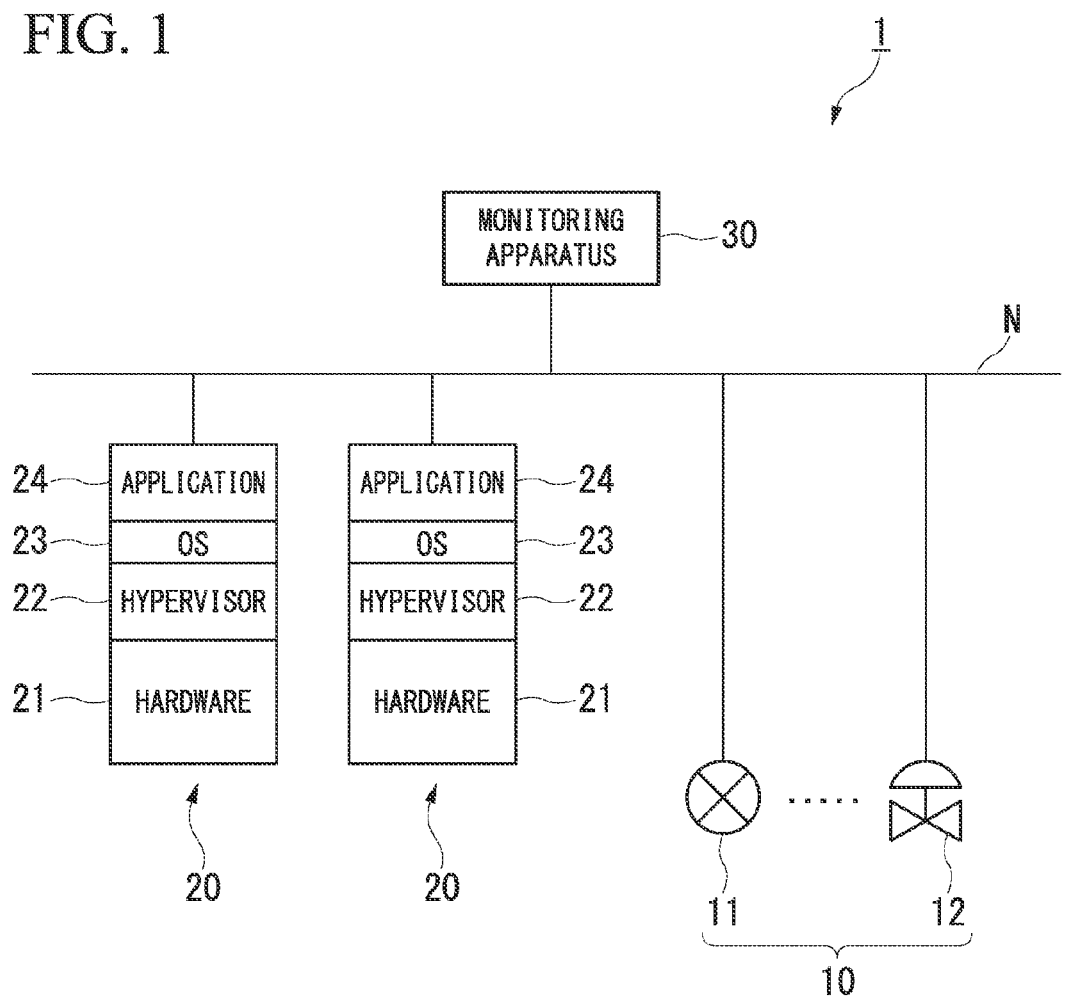
FIG. 1 is a block diagram illustrating the constitution of the main parts of a process control system in accordance with the first preferred embodiment of the present invention.

FIG. 1 is a block diagram illustrating the constitution of the main parts of a process control system in accordance with the first preferred embodiment of the present invention. As shown in FIG. 1, a process control system 1 of the first preferred embodiment has field devices 10, controllers 20, and a monitoring apparatus 30 and, by the controllers 20 controlling the field devices 10 under monitoring by monitoring apparatus 30, the industrial processes implemented in the plant (not shown) are controlled.

The field devices 10 are, for example, sensor devices such as flow gauges and temperature sensors, valve devices such as flow amount control valves and open/close valves, actuator devices such as fans, and motors, and other devices installed on-site in a plant. In FIG. 1, as an aid to understanding, of the field devices 10 installed in the plant, a sensor device 11 that measures the flow amount of a fluid and a valve device 12 that controls the flow amount of a fluid are illustrated.

The field devices 10 are connected to a network N laid throughout the plant and operate in accordance with control data transmitted from the controllers 20 via the network N. For example, if a controller 20 has transmitted to the sensor device 11 a request to transmit measurement data (data indicating the results of measuring the flow amount of a fluid), the sensor device 11 would transmit the measurement data to the controller 20 via the network N. If a control data (data controlling the opening) has been transmitted from a controller 20 to the valve device 12, the valve device 12 would open the valve passing a fluid to an opening instructed by the control data. The above-noted network N is, for example, a cable backbone network laid throughout the plant.

Under the monitoring by the monitoring apparatus 30, a controller 20 collects measurement data from a field device 10 such as the sensor device 11 and controls a field device 10 such as the valve device 12 based on the collected measurement data. The functionality of the controllers 20 is implemented by reading software into a computer, with software operating in concert with hardware resources.

Specifically, the functionality of the controllers 20 is implemented by executing an installed program implementing a hypervisor 22 (virtual part), a program implementing an operating system (OS) 23 (control unit), and a program implementing an application 24 (control unit) that are installed in hardware 21 made up of an MPU (microprocessing unit) and memory or the like. The hypervisor 22 may be referred to as a virtual part. A combination of the operating system (OS) 23 and the application 24 may be referred to as a control unit.

In this case, the hypervisor 22 runs virtually in the hardware 21 in place of hardware, and is provided to enable replacement of the hardware 21 without changing the operating system 23 and the application 24. The hypervisor 22 is also provided to achieve mutually synchronous operation between redundant controllers 20, if the controllers 20 are made redundant so as to increase the reliability.

That is, even if the hardware 21 is changed to hardware having different MPU architecture, memory size, cache size, memory map, device interface, and the like, the hypervisor 22 provides to the operating system 23 the same type of interface that was previously used. As a result, because the operating system 23 running in the hypervisor 22 is not affected by the change of the hardware 21, the operating system 23 and the applications 24 that had previously been used can run on the new hardware 21.

The operating system 23 runs in the hypervisor 22 and, for example, performs various management, such as process management and memory management that are required for operation of the applications 24. The applications 24 run in the operating system 23 and control field devices 10 (for example, collection of measurement data from the field devices 10 and transmission of control data to the field devices 10) necessary for process control.

The monitoring apparatus 30 monitors and manages the operating status (operating, standby, stopping, copying, idling, and the like) of the operating system 23 and the applications 24 running in the controllers 20. For example, the application in a controller in the standby status can be stopped, transfer being made to another controller that is idling and, after reaching synchronization with a currently used controller, redundant operation being started.

Figure 2:
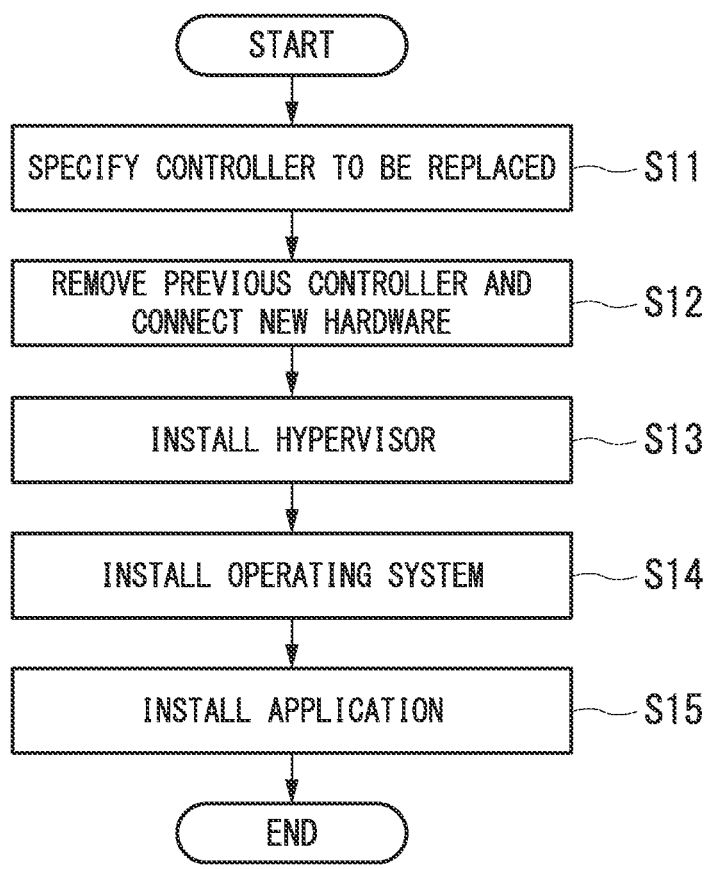
FIG. 2 is a flowchart illustrating an example of the procedure for replacement of a controller in accordance with the first preferred embodiment of the present invention.

Next, the procedure for replacing a controller 20 provided in the process control system 1 having the above-noted constitution will be described. A controller 20 is replaced in such cases as when a failure has occurred in a controller 20, when the processing capability of a controller 20 is to be improved, and when new functionality is to be added to a controller 20. FIG. 2 is a flowchart illustrating an example of the procedure for replacement of a controller in accordance with the first preferred embodiment of the present invention.

When the task of replacing a controller 20 is started, the on-site workers first perform the task of specifying the controller 20 to be replaced (step S11). Next, the task of removing the previous controller 20 specified at step S11 from the network N is performed, and the task of connecting a computer (new hardware 21) to be used as the new controller 20 to the network N is performed (step S12).

When the above-noted task of replacing the hardware 21 is completed, the task of installing the software in the computer to implement the functionality of the controller 20 is performed. Specifically, a program implementing the hypervisor 22 is first installed into the new hardware 21 connected to the network N to implement the functionality of the hypervisor 22 (step S13). Next, a program implementing the operating system 23 that had been used previously in the failed controller 20 and a program implementing the application 24 are successively installed, so as to implement the functionality of the operating system 23 and the application 24 (steps S14 and S15). By performing the above-noted tasks, the previously used operating system 23 and application 24 can be run on the new hardware 21.

In this case, to facilitate understanding, when the controller 20 is replaced, the description has been made for an example in which a worker performs the tasks of replacing the hardware 21 and installing the software on-site. However, the task of installing software into the new hardware 21 (tasks of steps S13 to S15 in FIG. 2) may be performed beforehand, the new hardware 21 subjected to these tasks being then brought on-site. By doing this, it is possible to limit the tasks performed on-site to the replacement of the hardware 21 (only the tasks of steps S11 and S12 in FIG. 2), thereby enabling a reduction in the on-site labor.

As described above, in the first preferred embodiment, the hypervisor 22 that runs in the hardware 21 in place of hardware is provided in the controller 20, and the operating system 23 and the application 24 are caused to run in hypervisor 22. As a result, it is possible to replace the hardware 21 without changing the existing operating system 23 and application 24 that had been previously used, and it is possible to flexibly change and add a controller 20 while maintaining compatibility, without replacing the existing system.

In the first preferred embodiment, because the operating system 23 and the application 24 running in the hypervisor 22 can be handled together, the backup and restoring thereof are facilitated. As a result, for example, it is easy to perform the backup and restoration tasks that are required when the previously used old hardware 21 is replaced by the new hardware 21.

Second Preferred Embodiment

Figure 3:
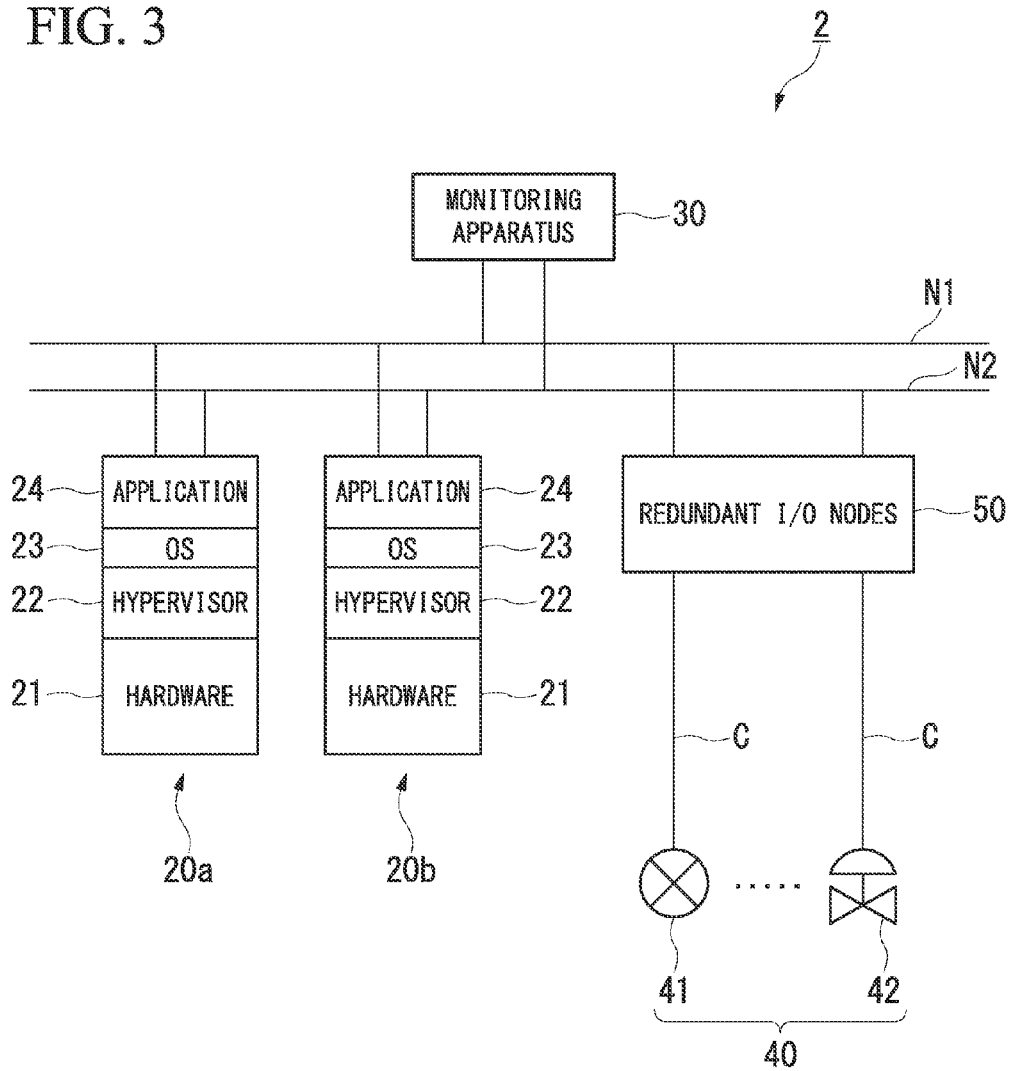
FIG. 3 is a block diagram illustrating the constitution of the main parts of a process control system in accordance with the second preferred embodiment of the present invention.

FIG. 3 is a block diagram illustrating the constitution of the main parts of a process control system in accordance with the second preferred embodiment of the present invention. The process control system 2 of the second preferred embodiment imparts redundancy to the constitution of the process control system 1 shown in FIG. 1 for the purpose of increasing the reliability. Specifically, in place of the field devices 10 shown in FIG. 1, the process control system 2 has the field devices 40 and redundant I/O nodes 50 (input/output nodes and, in place of the network N shown in FIG. 1, has redundant networks N1 and N2, and further, in place of the controllers 20 shown in FIG. 1, has the redundant controllers 20a and 20b. The redundant I/O nodes may be referred to as input/output nodes.

Although the field devices 40, similar to the field devices 10 shown in FIG. 1, are devices that are installed on-site in a plant, they differ from the field devices 10 in FIG. 1 in that they are connected to the redundant I/O nodes 50 by an analog transmission lines C, and are connected to the networks N1 and N2 via the redundant I/O nodes 50. The analog transmission lines C are, for example, transmission lines used for transmitting 4 to 20 mA signals.

That is, whereas the field devices 10 shown in FIG. 1 can communicate digitally via the network N, the field devices 40 in the second preferred embodiment input and output analog signals via the analog transmission lines C. In FIG. 3, similar to FIG. 1, of the field devices 40 installed in the plant, a sensor device 41 that measures the flow amount of a fluid and a valve device 42 that controls (operates) the flow amount of a fluid are illustrated.

The redundant I/O nodes 50 are connected to the networks N1 and N2 and converts between the signals (analog signals) input and output at the field devices 40 to signals (digital signals) that are communicated via the networks N1 and N2.

The networks N1 and N2, similar to the network N shown in FIG. 1, are, for example, cable backbone networks laid throughout the plant. The controllers 20a and 20b, similar to the controllers 20 shown in FIG. 1, by software working in concert with hardware resources, implement the functionality of the hypervisors 22, the operating systems 23, and the applications 24.

The controllers 20a and 20b are each connected to the redundant networks N1 and N2. The controllers 20a and 20b are operated in mutual synchronization by the hypervisors 22 provided in each thereof. With one of the controllers 20a and 20b as the controlling side and the other as the standby side, the controlling side controls a plurality of field devices, and the standby side performs synchronization with execution information of the controlling side. If trouble occurs on the controlling side, the standby side becomes the controlling side, taking over control and continuing to control the plant.

Figure 4:
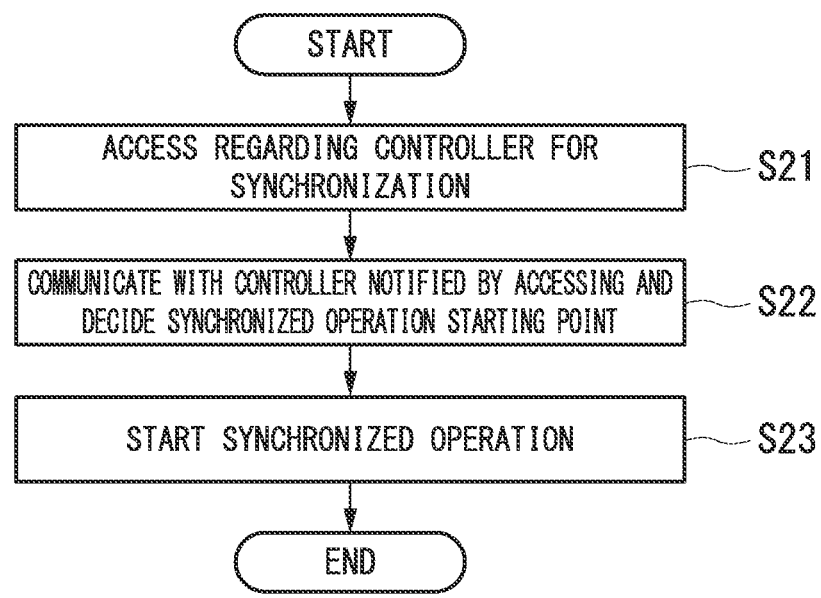
FIG. 4 is a diagram illustrating an example of the operation occurring when replacing a controller in accordance with the second preferred embodiment of the present invention.

Next, the operation that is performed when, of the redundant controllers 20a and 20b provided in the process control system 2 having the above-noted constitution, one thereof, the standby side (in this case, taken to be the controller 20b), is replaced, will be described. The controller 20b, similar to the case of the controller 20 shown in FIG. 1, is replaced in such cases as when a failure has occurred in the controller 20b, for example, by following the replacement procedure shown in the flowchart of FIG. 2. FIG. 4 is a diagram illustrating an example of the operation occurring when replacing a controller in accordance with the second preferred embodiment of the present invention.

When the previous controller 20b is replaced by a new controller 20b and the power is applied, first the hypervisor 22 provided in the new controller 20b accesses the monitoring apparatus 30 regarding the controller to which synchronization is to be done (step S21). In the second preferred embodiment, because the redundant controllers 20a and 20b are provided, a notification of the controller 20a as the access result is made from the monitoring apparatus 30 to the controller 20b.

When notification is made as to the controller to which synchronization is to be done, the hypervisor 22 of the controller 20b communicates with the hypervisor 22 of the notified controller 20a, and decides the starting point for synchronized operation (synchronized operation starting time) (step S22). When this processing ends, the hypervisor 22 of the controller 20b goes into the state of waiting for the arrival of the synchronized operation starting time decided at step S22. When the synchronized operation starting point arrives, the hypervisor 22 of the controller 20a transmits execution information to the hypervisor 22 of the controller 20b and, based on this execution information, the hypervisor 22 of the controller 20b starts synchronized operation (step S23).

After the above, execution information is periodically transmitted from the hypervisor 22 of the controller 20a to the hypervisor 22 of the controller 20b and, based on this execution information, the hypervisor 22 of the controller 20b adjusts the operation timing so as to operate the controller 20a and the controller 20b synchronously. By performing this type of operation, the difference in synchronization between the controller 20a and the new controller 20b is absorbed, and controller 20a and controller 20b operate in synchronous.

In this case, to facilitate understanding, the description has been for an example in which the hypervisor 22 of the new controller 20b accesses to the monitoring apparatus 30 regarding the controller to which synchronization is to be done. However, information indicating the controller to which synchronization is to be done may be stored beforehand in the controller 20b, the hypervisor 22 of the controller 20b deciding the synchronized operation starting point based on that information. By doing this, the accessing of the monitoring apparatus 30 can be omitted.

As described above, in the second preferred embodiment, hypervisors 22 running in the hardware 21 in place of hardware are provided in each of the redundant controllers 20a and 20b, and the operating system 23 and applications 24 are caused to run in the hypervisors 22, the operation of the controllers 20a and 20b being mutually synchronized by the hypervisors 22. As a result, similar to the first preferred embodiment, it is possible to flexibly change or add the controllers 20a and 20b while maintaining compatibility, without replacing the existing system, and to replace the hardware 21 (controller 20b) without stopping the process control system 2.

Also, in the second preferred embodiment, replacement of the hardware 21 can be done more flexibly than in the first preferred embodiment. For example, even if replacement of all of the controllers 20a and 20b at one time is not possible for budgetary reasons, it is possible to successively replace the controllers 20a and 20b that are within the budget. Also, replacement is possible not only of the hardware 21, but also of the software (the operating system 23 and the applications 24). An example would be replacement of the applications 24 with software that makes the most of the processing capabilities of the new hardware 21 after replacing all of the hardware 21 of the controllers 20a and 20b.

Figure 5:
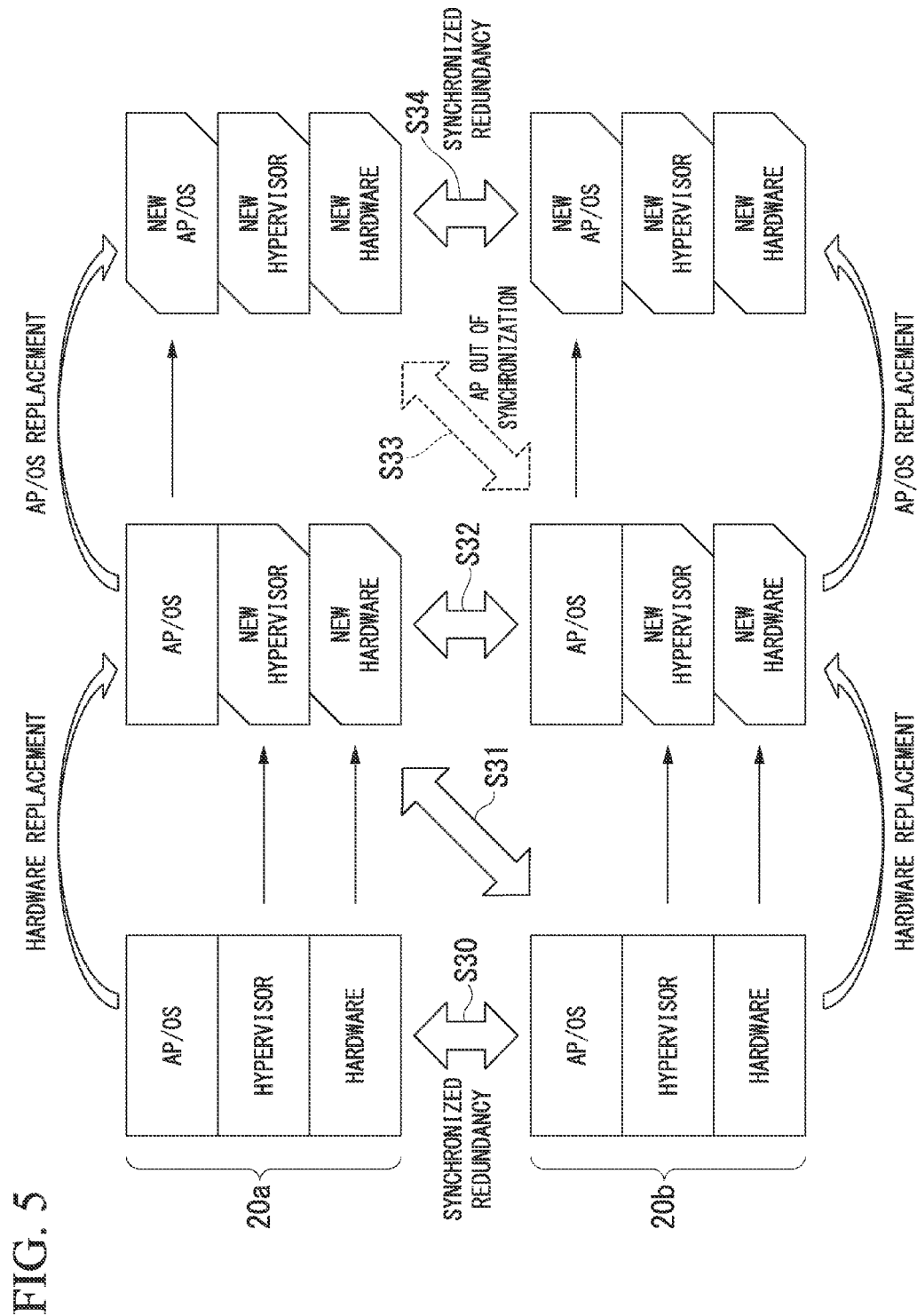
FIG. 5 is a diagram illustrating an example of the procedure for replacing a controller in accordance with the second preferred embodiment of the present invention.

FIG. 5 is a diagram describing the procedure for replacing a controller in accordance with the second preferred embodiment of the present invention. In FIG. 5, the operating system 23 and the applications 24 provided in the controllers 20a and 20b are represented as AP/OS. Also, the redundant controllers 20a and 20b are assumed to be synchronously operating in the initial state as shown in FIG. 5 (step S30).

First, if the hardware of the controller 20a is to be replaced, the hardware and the hypervisor can be replaced by new hardware and a new hypervisor without changing the previous AP/OS. The controller 20a for which the hardware has been replaced and the controller 20b operate redundantly in synchronous (step S31). Next, if the hardware of the controller 20b is to be replaced, similar to the case of replacing the hardware of the controller 20a, the hardware and the hypervisor can be replaced by new hardware and a new hypervisor without changing the previous AP/OS. The controller 20a for which the hardware has been replaced and the controller 20b for which the hardware has been replaced operate redundantly in synchronous (step S32).

Next, if the software of the controller 20a is to be replaced, it is sufficient to change only the previous AP/OS to a new AP/OS. Then, the controller 20b and the controller 20a for which the software has been replaced operate synchronously at a logical synchronization point that was incorporated beforehand (a point having a different execution address, but at which the same logical processing is done) (step S33). In the case also in which software of the controller 20b is to be replaced, similar to the case of replacing the software of the controller 20a, it is sufficient to change only the previous AP/OS to a new AP/OS. By doing this, the controller 20a and the controller 20b operate redundantly in synchronous (step S34). In this manner, the hardware and the AP/OS can be changed while continuing the operation of the AP/OS.

Also, in the second preferred embodiment, similar to the first preferred embodiment, because the operating system 23 and the application 24 running in the hypervisor 22 can be handled together, the backup and restoring thereof are facilitated. As a result, for example, it is easy to perform the backup and restoration tasks that are required when the previously used, old hardware 21 is replaced by a new hardware 21. Additionally, although the redundant I/O nodes 50 are constituted so as to perform analog transmission with the field devices 40, a field bus using digital transmission or wireless may be used.

Third Preferred Embodiment

Figure 6:
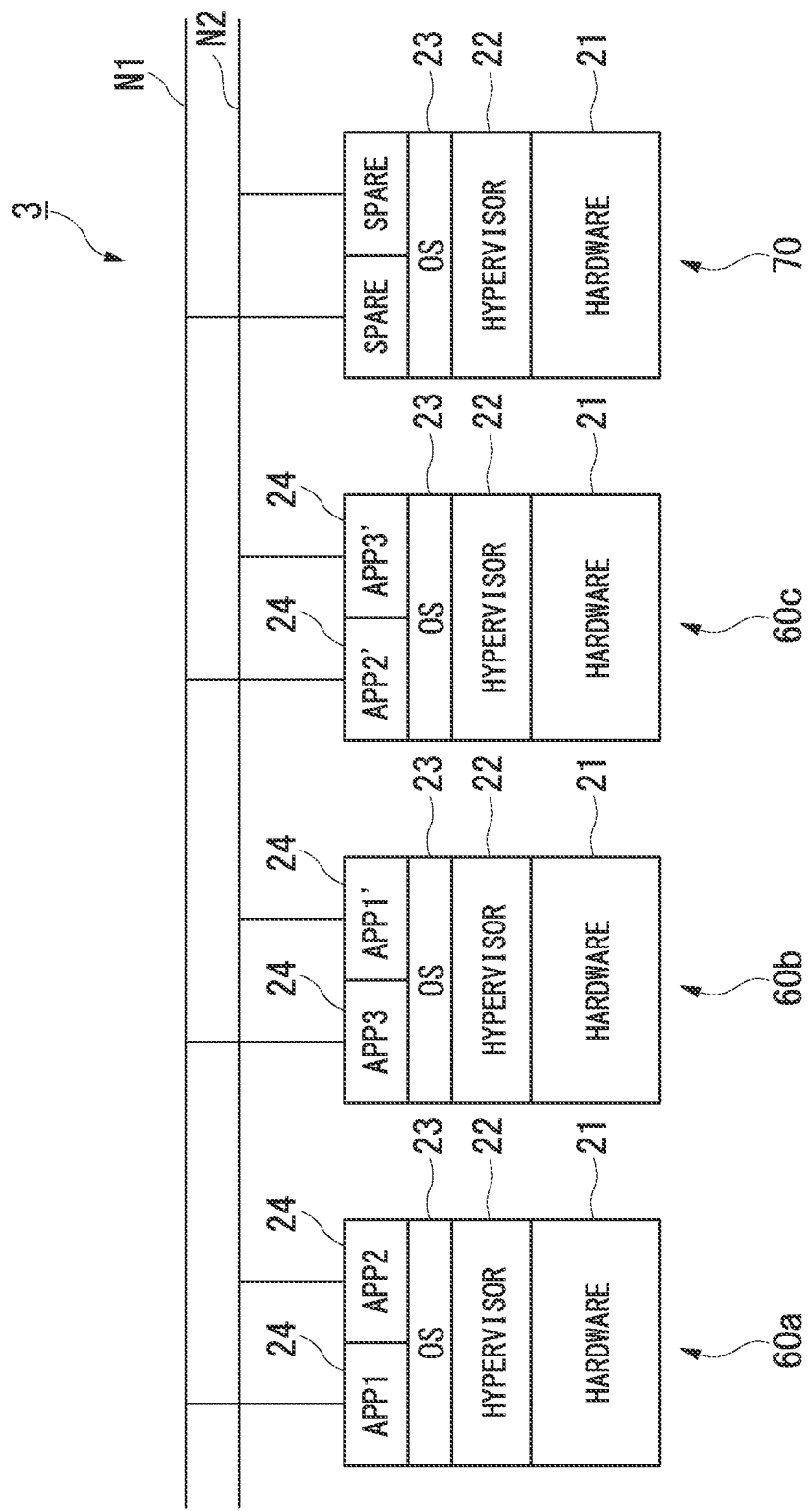
FIG. 6 is a block diagram illustrating the constitution of the main parts of a process control system in accordance with the third preferred embodiment of the present invention.

FIG. 6 is a block diagram illustrating the constitution of the main parts of a process control system in accordance with the third preferred embodiment of the present invention. The process control system 3 of the third preferred embodiment, in addition to providing redundancy between different controllers within which a plurality of applications 24 that control the field devices 10 are caused to run, a spare controller is additionally provided for the controllers.

Specifically, the process control system 3, as shown in FIG. 6, has controllers 60a to 60c, within which a plurality of applications 24 run, and a spare controller 70, which are connected to the networks N1 and N2. For the purpose of simplification, the monitoring apparatus 30, the field devices 40, and the redundant I/O nodes 50 and the like shown in FIG. 3 have been omitted in FIG. 6.

As shown in FIG. 6, two applications 24 that run without mutual interference in the operating system 23 are implemented within each of the controllers 60a to 60c. In this case, to distinguish between the applications 24 running in each of the controllers 60a to 60c, the two applications 24 running in the controller 60a will be APP1 and APP2, the two applications 24 running in the controller 60b will be APP3 and APP1', and the two applications 24 running in the controller 60c will be APP2' and APP3'.

Of the applications running in the above-noted controllers 60a to 60c, there is redundancy between the application APP1 running in the controller 60a and the application APP1' running in the controller 60b, between the application APP2 running in the controller 60a and the application APP2' running in the controller 60c, and between the application APP3 running in the controller 60b and the application APP3' running in the controller 60c.

The spare controller 70 is provided to implement the same functionality as in a failed controller, in the event that one of the controllers 60a to 60c fails, without performing the task of replacing the failed controller. The hypervisor 22 and the operating system 23 are implemented in the controller 70, similar to the controllers 60a to 60c, and provide an interface capable of causing operation of the operating system 23 and applications 24 the same as in the controllers 60a to 60c. For this reason, for example, if the program that implements the application APP1 running in the controller 60a is installed in the spare controller 70, the application APP1 can be caused to run in the spare controller 70.

Next, the operation when one of the controllers 60a to 60c provided in the process control system 3 having the above-described constitution fails will be described. In this case, the description will be for the case of a failure of the controller 60a. If the controller 60a fails, the state occurs in which the control by the applications APP1 and APP2 that had been running in the controller 60a is handled by the application APP1' running in the controller 60b and the application APP2' running in the controller 60c.

Even if this state occurs, if the program for implementing the applications APP1 and APP2 that had been running in the controller 60a is installed in the spare controller 70, the spare controller 70 can be caused to operate as the controller 60a. As a result, even if the task of replacing the failed controller 60a is not performed, the condition in which there is redundancy between the applications APP1 and APP1' and the condition in which there is redundancy between the applications APP2 and APP2' are reproduced.

Although the description of the example shown in FIG. 6 has been presented in which one spare controller 70 is provided with respect to the three controllers 60a to 60c, even when n controllers (where n is an integer of 2 or greater) are provided, it is sufficient that at least one spare controller be provided. Also, the installation of the program (the program implementing the application that had been running in the failed controller) with respect to the spare controller 70 can be done by the monitoring apparatus 30, and can alternatively be done by the spare controller 70 detecting the failed controller.

As described above, in the third preferred embodiment, controllers 60a to 60c are provided in which there are redundant hypervisors 22 operating in the hardware 21 in place of hardware, the operating system 23 and the applications 24 running in the hypervisors 22, and operation of the controllers 60a to 60c being mutually synchronized by the hypervisors 22. For this reason, similar to the second preferred embodiment, it is possible to flexibly add or change the controllers 60a to 60c while maintaining compatibility and without replacing the existing system, and it is possible to replace the hardware 21 (controllers 60a to 60c) without stopping the process control system 3.

Also, in the third preferred embodiment, the spare controller 70 is provided for the controllers 60a to 60c, so that a program implementing an application that had been running in a failed controller is installed in the spare controller 70. For this reason, it is possible to implement the same functionality as the failed controller, without performing the task of replacing the failed controller. Additionally, in the third preferred embodiment, because a plurality of applications are caused to run in each of the controllers 60a to 60c, compared with the case of running only one application, it is possible to reduce the number of controllers (number of the hardware 21), thereby enabling a reduction in the installation surface area, maintenance labor, power consumption, and the like.

Although the foregoing has been a description of a process control system in accordance with preferred embodiments of the present invention, the present invention is not restricted to the above-described preferred embodiments, and can be freely modified, within the scope thereof. For example, in the above-noted preferred embodiments, the description has been of examples in which field devices, controllers, and a monitoring apparatus are connected via a cable network, the present invention can also be applied in the case of a connection via a wireless network.

The present invention provides a process control system that enables flexible changing and adding of devices while maintaining compatibility and without replacing an existing system.

According to a preferred embodiment of the present invention, a virtual part that operates in hardware in place of hardware is provided in the controller, and a control unit that controls the operation of field devices is operated in the virtual part. For this reason, it is possible to replace hardware without changing an existing control unit that had previously been used, and it is possible to flexibly change or add a controller while maintaining compatibility, without replacing an existing system.

Also, according to the present invention, because at least two controllers are provided to achieve redundant operation, the controller can be changed without stopping the plant.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A process control system performing control of an industrial process implemented in a plant, the process control system comprising:
   a network provided in the plant;
   a plurality of field devices connected to the network, each of the plurality of field devices is configured to perform at least one of a measurement and an actuation required for control of the industrial process; and
   at least one or more controllers, connected to the network, each controller having a first hardware, a virtual part which is provided on the first hardware and on which an operating system, which manages an application for controlling the field devices, runs, and a control unit configured to control operations of the field devices via the network, wherein the control unit comprises the operating system that runs in the virtual part and the application that runs in the operating system,
   wherein, when the first hardware is replaced by a second hardware,
   a program implementing the virtual part is installed into the second hardware so as to implement a functionality of the virtual part, and
   a program implementing the operating system and a program implementing the application that had been previously used in the first hardware are installed into the second hardware, so as to implement a functionality of the operating system and a functionality of the application on the second hardware.

2. The process control system according to claim 1, wherein the virtual part is a hypervisor.

3. The process control system according to claim 1, wherein at least two of the controllers are provided and operate redundantly.

4. The process control system according to claim 3, wherein the network is made redundant.

5. The process control system according to claim 4, wherein
   the network includes a first network and a second network, and
   the process control system further comprising:
   input/output nodes connecting to the first network and the second network, the input/output nodes being configured to relay a signal input/output at the field devices and a signal communicated via the first network and the second network.

6. The process control system according to claim 5, further comprising:
   a monitoring apparatus configured to monitor and manage an operating status of the operating system and the applications running in the controllers so that the application in at least one of the controllers in a standby status can be stopped, transfer being made to another one of the controllers that is idling and, after reaching synchronization with a currently used one of the controllers, redundant operation being started.

7. The process control system according to claim 3, wherein the process control system further comprises:
   a monitoring apparatus configured to monitor and manage an operating status of the operating system and the applications running in the controllers so that the application in at least one of the controllers in a standby status can be stopped, transfer being made to another one of the controllers that is idling and, after reaching synchronization with a currently used one of the controllers, redundant operation being started.

8. The process control system according to claim 1, further comprising:
   input/output nodes connecting to the network, the input/output nodes being configured to relay an input/output signal at the field devices and a signal communicated via the network.

9. The process control system according to claim 1, further comprising:
   a spare controller connecting to the network, the spare controller having a virtual part configured to be capable of causing operation of a control unit that is the same as a control unit provided in at least one of the controllers in which a failure has occurred.

10. The process control system according to claim 1, wherein,
    when replacing the first hardware to the second hardware, installing software into the second hardware is performed beforehand and the second hardware subjected to the installing is then brought on-site so that it is possible to limit tasks performed on-site to a replacement of the first hardware.

11. A process control system performing control of an industrial process implemented in a plant, the process control system comprising:
a network provided in the plant;
a plurality of field devices connected to the network, each of the plurality of field devices is configured to perform at least one of a measurement and an actuation required for control of the industrial process; and
at least two controllers connected to the network and operating redundantly, each of the controllers having a virtual part configured to operate in hardware in place of hardware, and a control unit configured to operate in the virtual part and to control operations of the field devices via the network, each of the controllers being configured to enable replacement of hardware without changing the control unit,
wherein the network is made redundant,
the network includes a first network and a second network, and
the process control system further comprises:
input/output nodes connecting to the first network and the second network, the input/output nodes being configured to relay a signal input/output at the field devices and a signal communicated via the first network and the second network,
the control unit has an operating system that runs in the virtual part and an application that runs in the operating system, and
the process control system further comprises:
a monitoring apparatus configured to monitor and manage an operating status of the operating system and the applications running in the controllers so that the application in at least one of the controllers in a standby status can be stopped, transfer being made to another one of the controllers that is idling and, after reaching synchronization with a currently used one of the controllers, redundant operation being started,
when an old one of the controllers is replaced by a new controller, the virtual part provided in the new controller accesses the monitoring apparatus regarding another one of the controllers to which synchronization is to be done;
when notification is made as to the controller to which synchronization is to be done, the virtual part of the new controller communicates with the virtual part of the notified controller to which synchronization is to be done, and decides a synchronized operation starting time that is a starting point for synchronized operation;
the virtual part of the new controller goes into a state of waiting for an arrival of the synchronized operation starting time; and
when the synchronized operation starting time arrives, the virtual part of the controller to which synchronization is to be done transmits execution information to the virtual part of the new controller and, based on the execution information, the virtual part of the new controller starts synchronized operation.

12. A process control method for controlling an industrial process implemented in a plant, by using a process control system comprising:
a network provided in the plant;
a plurality of field devices connected to the network, each of the plurality of field devices is configured to perform at least one of a measurement and an actuation required for control of the industrial process; and
at least one or more controllers, connected to the network, having a first hardware, a virtual part configured to virtually run in the first hardware, and a control unit configured to control operations of the field devices via the network, wherein the control unit has an operating system that runs in the virtual part and an application that runs in the operating system and controls the field devices,
the process control method comprising a step of replacing the first hardware to a second hardware, the step including:
installing a program implementing the virtual part into the second hardware so as to implement a functionality of the virtual part on the second hardware; and
installing a program implementing the operating system and a program implementing the application that had been used previously in the first hardware into the second hardware, so as to implement a functionality of the operating system and a functionality of the application on the second hardware.

13. The process control method according to claim 12, wherein at least two of the controllers are provided, one of which is a first controller and one of which is a second controller, and operate redundantly, and the process control method further comprises:
accessing, by the virtual part provided in a new controller, a monitoring apparatus regarding the second controller to which synchronization is to be done when the first controller is replaced by the new controller;
communicating, by the virtual part of the new controller, with the virtual part of the second controller to which synchronization is to be done, and deciding a synchronized operation starting time that is a starting point for synchronized operation when notification is made as to the second controller to which synchronization is to be done;
going, by the virtual part of the new controller, into a state of waiting for an arrival of the synchronized operation starting time;
transmitting, by the virtual part of the second controller to which synchronization is to be done, execution information to the virtual part of the new controller when the synchronized operation starting time arrives; and
starting, by the virtual part of the new controller, synchronized operation based on the execution information.

* * * * *